United States Patent [19]

Wisting

[11] Patent Number: 5,271,316
[45] Date of Patent: Dec. 21, 1993

[54] APPARATUS FOR COOKING FOOD

[76] Inventor: Walter L. Wisting, 1969 Foxon Rd., N. Branford, Conn. 06471

[21] Appl. No.: 992,445

[22] Filed: Dec. 17, 1992

[51] Int. Cl.$^5$ .............................................. A47J 37/04
[52] U.S. Cl. ................................. 99/420; 99/421 V; 99/427; 99/443 C; 99/446; 99/448
[58] Field of Search ............ 99/341, 446, 448, 443 C, 99/427, 419, 420, 421 V, 421 H, 477, 478, 479; 198/477.1, 687, 952; 219/388, 400; 426/243, 523; 126/21 A, 21 R, 41 R, 273 R; 432/10, 11, 148

[56] References Cited

U.S. PATENT DOCUMENTS

| | | |
|---|---|---|
| 2,687,080 | 8/1954 | Dorin . |
| 2,762,292 | 9/1956 | Chicknavorian ................. 99/421 V |
| 2,839,409 | 6/1958 | Matlen . |
| 3,003,409 | 10/1961 | Mills ..................................... 99/420 |
| 3,125,017 | 3/1964 | Tauber et al. . |
| 3,400,651 | 9/1968 | Hatch ................................... 99/427 |
| 3,734,740 | 5/1973 | Zenos ............................... 99/420 X |
| 4,241,649 | 12/1980 | Nelson et al. . |
| 4,366,177 | 12/1982 | Wells et al. . |
| 4,401,018 | 8/1983 | Berry . |
| 4,440,071 | 4/1984 | Boosalis et al. . |
| 4,473,004 | 9/1984 | Wells . |
| 4,590,848 | 5/1986 | Willingham . |
| 4,591,333 | 5/1986 | Henke . |
| 4,635,539 | 1/1987 | Tanaka . |
| 4,744,292 | 5/1988 | Nagata ................................. 99/427 |
| 4,947,741 | 8/1990 | Gongwer ......................... 99/443 C |
| 5,006,355 | 4/1991 | Stuck et al. ..................... 99/443 C |
| 5,158,066 | 10/1992 | Dodgen ................................ 99/446 |

FOREIGN PATENT DOCUMENTS

| | | |
|---|---|---|
| 3214818 | 11/1983 | Fed. Rep. of Germany ... 99/421 V |
| 0085694 | 7/1981 | Japan ..................................... 99/420 |

*Primary Examiner*—Timothy F. Simone
*Attorney, Agent, or Firm*—Robert H. Montgomery

[57] ABSTRACT

A cooking device which comprises a housing member having open entrance and exit ends, horizontally directed heating elements within the housing define a path for movement of food products, and a cooking area therebetween, a transport mechanism for moving food carriers through the defined path, a plurality of first carrier members are carried on the transport mechanism, the first carrier members are spaced along the length of the transport mechanism, the first carrier members are constructed and arranged to carry second food carrier members thereon between the entrance and exit ends between the cooking elements and drop a second food carrier member at the exit end, a fluid manifold behind each of said cooking elements and extending at least the length of the cooking elements, the cooking elements comprising lengths of porous ceramic material. A combustible pressurized fluid mixture is supplied to the manifolds whereby the fluid mixture move through the porous ceramic from the manifolds and be ignited on the other side of the ceramic elements and the ceramic elements provide radiant heat on either side of the path. The housing member defines a hood having openings at the top thereof, a shroud is within the hood and defines paths for contaminants such as smoke and products of cooking on either side of the hood above the cooking area whereby heated air, smoke and particles thereof move up the defined paths above the cooking area in a high temperature which burns off the by-products of the cooking process.

11 Claims, 4 Drawing Sheets

APPARATUS FOR COOKING FOOD

FIELD OF THE INVENTION

This invention relates to an apparatus for cooking foods.

BACKGROUND OF THE INVENTION

It is known to utilize heating sources on either side of a meat or other food which has been carried between two heating sources by a conveyer as exemplified in U.S. Pat. No. 4,440,071.

Also U.S. Pat. No. 4,635,539 shows that it is known to pass meat on skewers on a chain drive between opposed heating elements. The prior art generally discloses devices for cooking food products, primarily meats, which travel on a conveying device in ovens which heat and cook the food product from either side thereof.

However, this known prior art as exemplified by the two patents mentioned above and the patents listed in the information disclosure statement included with this application do not disclose devices for rapidly cooking food products at high temperatures in which the food products travel between radiant heating elements on either side of a horizontal path of travel of the food products and in which the food products may be rapidly cooked. Nor does the known prior art as previously mentioned disclose any device for incinerating the by-products of the cooking process, namely grease, smoke particles and contaminants prior to exhaust from the cooking device.

Accordingly the present invention provides a new and improved cooking device in which the food products are continuously passed between heating elements on either side thereof which provide radiant heat at very high temperatures to quickly cook the food in a matter of minutes or less and in which the cooking device is so designed that the smoke with contaminants therein due to the cooking process rise through a high temperature area which incinerates the contaminants and the smoke resulting from cooking and exhausts essentially odor-free, clean air from the cooking device.

An object of this invention is to provide a new and improved apparatus for rapidly cooking food products at high temperature.

Another object of this invention is to provide a new and improved cooking device which includes means for incinerating the contaminants and the smoke, grease, and odors resulting from the cooking of the food products.

A further object of this invention is to provide a new and improved apparatus for cooking foods in which the food products may be continuously cooked at uniform temperature while traveling in a linear horizontal path between an insertion point and a dropoff point.

SUMMARY OF THE INVENTION

Briefly stated, the invention in one form thereof comprises a cooking device which comprises a housing member having open entrance and exit ends, horizontally directed heating elements within the housing define a path for movement of food products and a cooking area therebetween, a first shaft having a sprocket wheel thereon journaled in the housing adjacent the entrance end, a second shaft having a sprocket wheel thereon journaled to the housing adjacent the exit end, an endless chain disposed about the sprocket wheels, means for driving at least one of the wheels whereby the chain moves in said housing over and between the wheels, a plurality of first carrier members carried on the chain, the first carrier members being spaced along the length of the chain, the first carrier members constructed and arranged to carry second food carrier members thereon between the entrance and exit ends between the cooking elements and drop a second food carrier member at the exit end, a fluid manifold behind each of said cooking elements and extending at least the length of the cooking elements, the cooking elements comprising lengths of porous ceramic material.

Means are provided for introducing a combustible fluid mixture under pressure to the manifolds whereby the fluid mixture will move through the porous ceramic from the manifolds and may be ignited on the other side of the ceramic elements and the ceramic elements provide radiant heat on either side of food on the second carrier members, The housing member defines a hood of generally steeple shape having outlet openings at the top thereof, a shroud is within said hood and defines paths for contaminants such as smoke and attendant products of cooking on either side of the hood above the cooking area whereby heated air, smoke and particles thereof move up said paths above the cooking area in a high temperature which burns off contaminants in the housing. Means are provided for directing the hot air and gases to the paths where contaminants in the gases are burned prior to exhaust.

DETAILED DESCRIPTION OF PREFERRED EMBODIMENTS OF THE INVENTION

Figure 1:
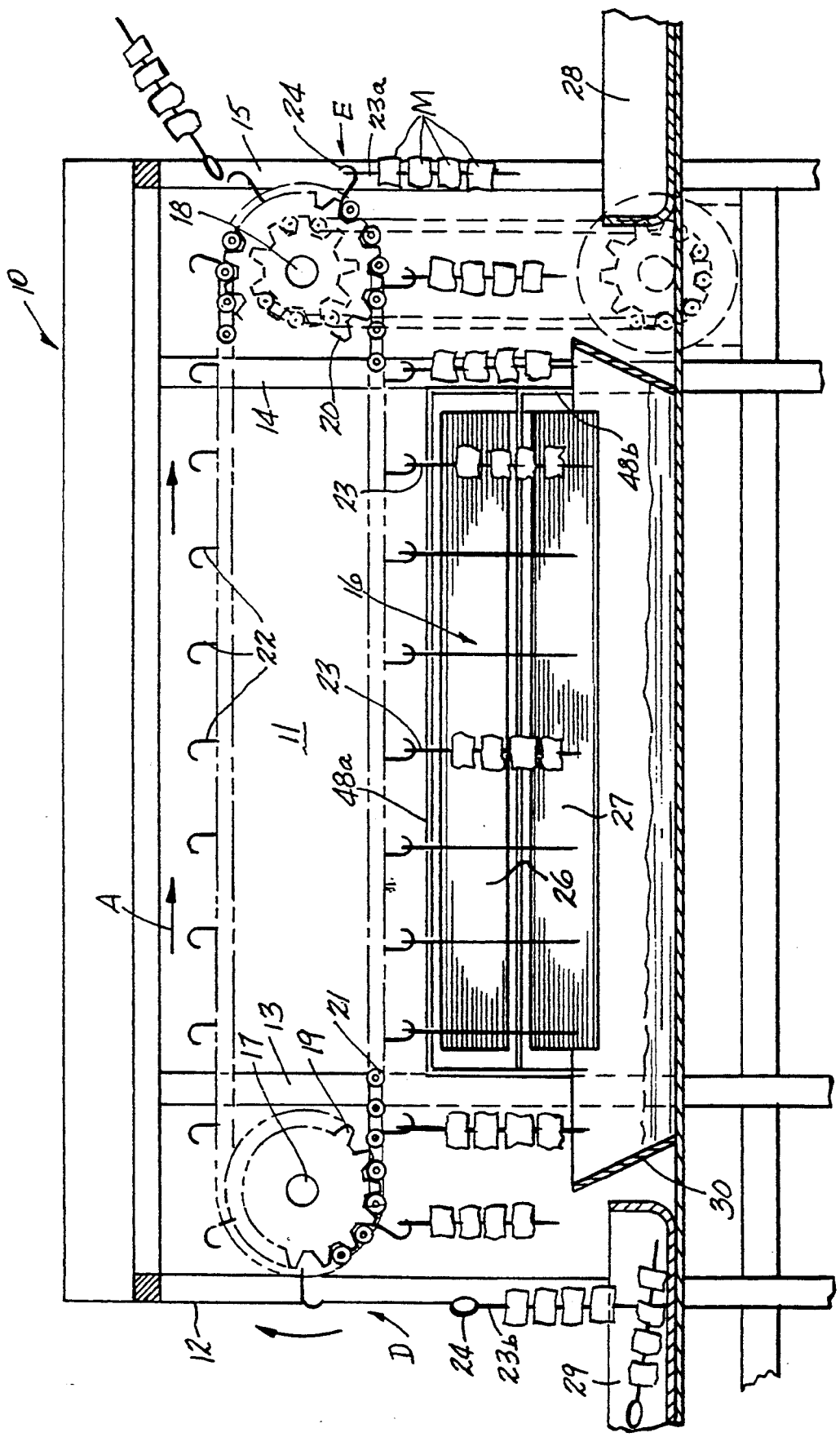
FIG. 1 is a vertical substantially half sectional side elevation of an apparatus embodying the invention.

An apparatus 10 embodying the invention as shown in FIG. 1 comprises a frame 11 which is exemplified by support members 12, 13, 14 and 15 on either side of what may be referred to as a cooking area designated by the reference numeral 16 between supports 13 and 14.

Shafts 17 and 18 are journaled into the apparatus as hereinafter described. Shaft 17 carries thereon a cog wheel or gear 19 while shaft 18 carries thereon a cog wheel or gear 20. Disposed about the cog wheels 19 and 20 is a sprocket chain 21 carrying thereon spaced apart hangers or first carrier members 22 which support thereon food carrying devices or second carrier members 23 shown as skewers having an eye 24 more clearly shown in FIG. 3 which are hung from hangers 22.

The food carrying devices shown as skewers 23 may be replaced with grids or other types of carriers for different types of food. The sprocket chain 21 moves in the direction of the arrow A with the carriers 23 suspended from the hangers 22 between upper and lower heating or cooking elements 26 and 27 which are hereinafter described and which are disposed on either side of the path of travel of the food from an entrance area E to a discharge area D. For purposes of illustration the food to be cooked is shown to be chunks of meat M on a skewer 23a as it is about to enter the cooking area 16. A pan 28 is located on the food entrance side of the apparatus 10 and a collection tray 29 is located on the delivery side or discharge end D of the apparatus 10.

At least one of the sprocket wheels 18 or 19 is motor driven as will hereinafter be described.

As shown in FIG. 1 a food carrier shown as skewer 23a may have its eye 24 placed on one of the hangers 22 as shown at the right hand side of FIG. 1. Thereafter it will travel between the upper and lower heating elements 25 and 26 on either side until a hanger commences to travel about sprocket wheel 19 at which time it will fall off of the hanger shown as 23b and into collection tray 29.

A collection tray 30 is disposed beneath the cooking area with water therein to catch any dripping grease.

Figure 2:
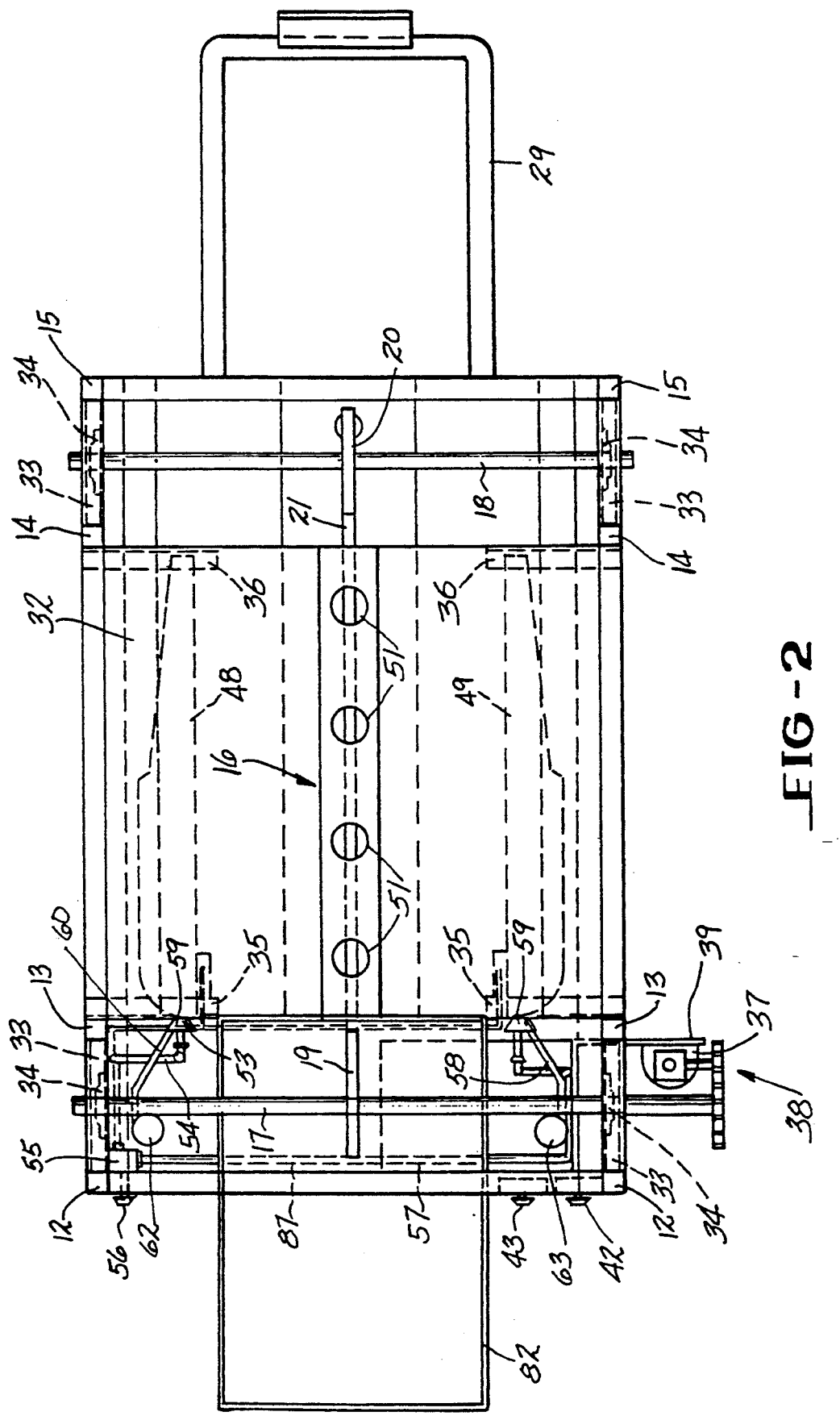
FIG. 2 is a top plan view of the apparatus of FIG. 1.

Reference is now made to FIG. 2, which is a top plan view of the apparatus of FIG. 1. The housing further includes a hood member 32 overlying cooking area 26. Shaft support members 33 are fixed between upright support members 12 and 13 on either side of the frame 11. Shaft support members 33 are fixed between upright support members 14 and 15 on either side of frame 11. Shaft 17 is journaled at either end in members 33 and shaft 18 is journaled in members 33. The members 33 are generally shallow U-shaped members and carry bearings 34 for rotatively supporting the shafts 17 and 18.

Manifold support members 35 extend inwardly of the housing from upright support members 13 and manifold support members 36 extend inwardly of the housing from upright support members 14.

Shaft 17 is driven by a motor and gear reduction drive 37 through either a gear drive or a sprocket and chain drive 38. With this arrangement, chain 21 is driven from motor and gear reduction drive 37. The motor and gear reduction drive are supported on a plate 39 extending from upright support member 13.

A speed control knob 42 for controlling the speed of motor gear drive 37 is mounted to the housing as is a blower speed control knob 43 hereinafter explained. A gas ON-OFF control knob 44 is also mounted to the housing. The controls are hereinafter disclosed schematically.

Two pairs of manifolds 48 and 49 hereinafter identified as 48a, 48b, 49a and 49b, are shown in broken line beneath hood 32 in FIG. 2 on either side of cooking area or path 16.

Hood 32 has a plurality of upper exhaust openings or ports 51 as will be hereinafter more apparent in conjunction with the discussion of FIG. 3.

Communicating with and providing entrance of gas into manifold 48 is a mixing nozzle 53 receiving gas over line 54 through a valve 55 having a turn off knob 56. Also gas is supplied over a manifold 57 through line 58 to a mixing nozzle 59 which admits gas and air as hereinafter described to manifold 49. The mixing nozzles 53 and 58 are also supplied air over a line 59 to nozzle 58 and line 60 to nozzle 53 as will hereinafter be described. There are air manifolds 62 and 63 supplying air to nozzles 53 and 59 so that there will be a combustible mixture of air and gas in the manifolds 48 and 49.

Figure 3:
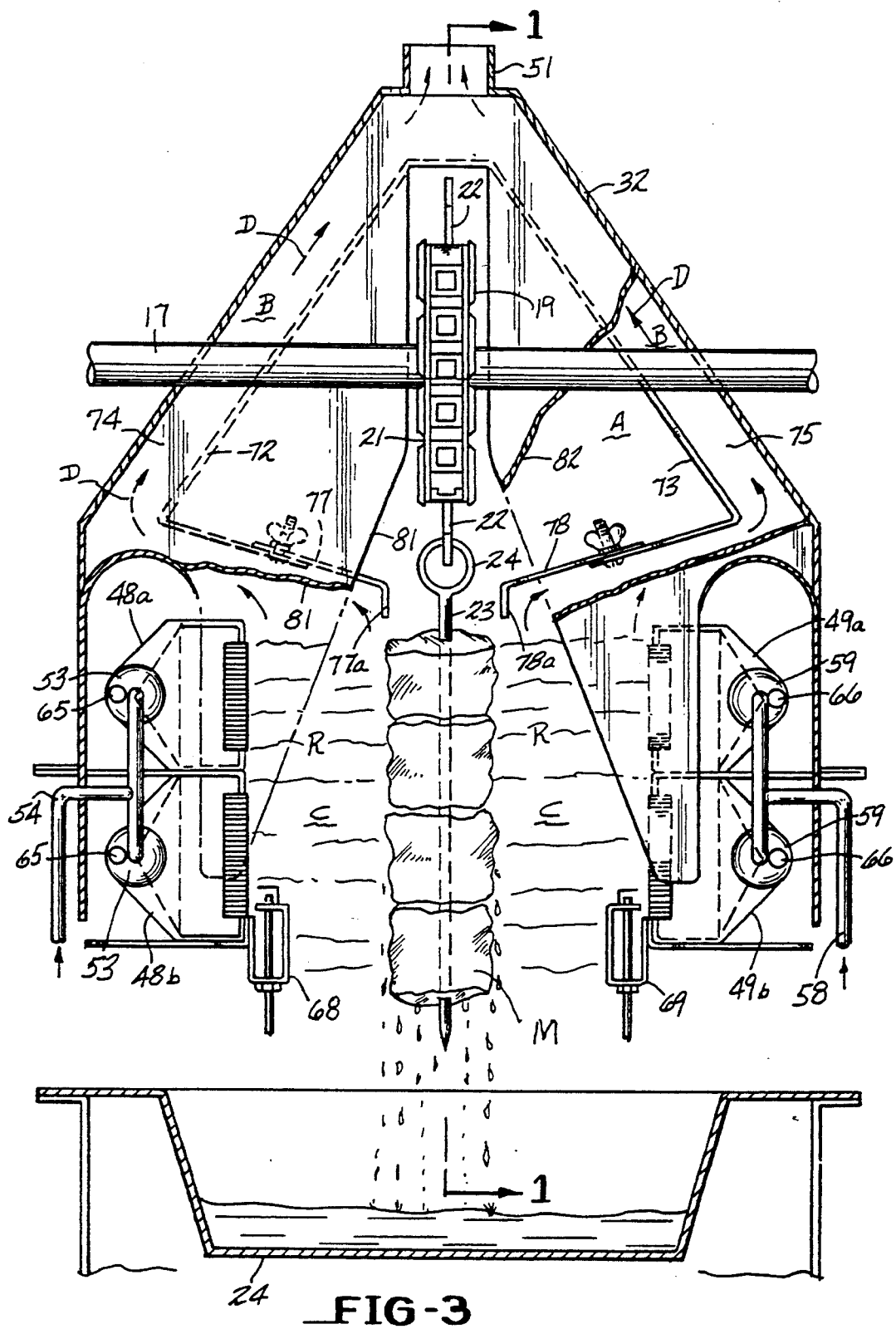
FIG. 3 is an end view of the apparatus of FIG. 1 seen from the right hand side thereof.

Reference is now made to FIG. 3 which is an end view of the housing 10 seen from the left hand side as viewed in FIG. 2.

As shown in FIG. 3 each of the manifolds 48 and 49 are actually double manifolds 48a, 48b on one side and 49a, 49b on the other. However, there could be a single manifold on each side with either single or double burners depending on the dimensions desired. The manifolds 48a and 48b have mixing nozzles 53 receiving gas over line 54. The nozzles 53 have openings 65 therein for receiving air. Similarly, the manifold 49 is shown as double manifolds 49a and 49b, having the mixing nozzles 59 therein receiving gas through a manifold 58. The nozzles 59 also have openings 66 therein for receiving air for mixing with the gas. Also shown in FIG. 3 are spark pilot members 68 in conjunction with manifolds 48a and 48b and 69 in conjunction with manifolds 49a and 49b. The spark pilot members are provided to ignite the burners.

As will hereinafter be described, the interior hood 32 has areas designated as A, B, and C, which will hereinafter be referred to with discussion as to temperatures in the burner housing. Positioned within hood 32 are interior members 72 and 73 which together with the exterior of hood 32 define passages 74 and 75 respectively.

As the meat or other product on a food carrier 23 is transported between the burners from one end to the other in area C it may be subjected to a heat of 1200° to 1600° F. due to radiant heat, indicated by the lines R in FIG. 3, emanating from the burners.

Attached to member 72 is an adjustable collector plate 77 and attached to member 73 is an adjustable collector plate 76. These collector plates have lips 77a and 78a to aid in directing smoke and products of combustion into passages 74 and 75. Collector plates 77 and 78 are positioned to give a minimal dimension between lips 77a and 78a and to direct all smoke, grease, and odors into the passages 74 and 75. The temperature in the area A approximately 400°-500° F., while the temperature in the passages 74-75 will be on the order of 900°-1000° F. Thus, the temperature in the passages 74 and 75 is sufficiently high to burn off all collected contaminants, namely grease, smoke, and odors as they exit through passages 74 and 75 as designated by the arrows D. The result of this construction is essentially odor and smoke free exhaust through upper ports 51.

At the ends of the housing 10 are preferably placed plates 81 and 82 which will block off the cooking areas at the ends and help prevent escape of heat at the ends. As further shown in FIG. 3 there is a transport of meat M on a carrier or skewer 23 between the heating elements.

Figure 4:
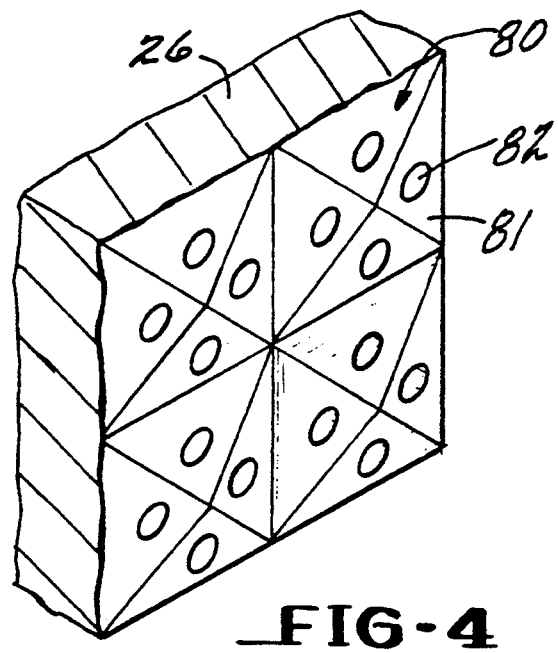
FIG. 4 is a perspective view of a portion of a burner unit used in the invention.

Reference is now made to FIG. 4 which shows in perspective a partial section of ceramic heating elements 26 or 27, identified as 26. These heating elements are of ceramic, approximately one half inch thick, and preferably have twenty five raised, four-sided, pyramidal surfaces 80 per square inch. Each pyramidal section surface 81 preferably has a small hole or aperture 82 therein resulting in one hundred holes or aperatures per square inch. The ceramic fixtures 26 or 27 may be in sections, as for example three sections each about 5¼–5½ inches long, fitted into a metal frame which is received in each of the manifolds 48a and 49b. Alternatively, the ceramic elements can be made in one piece for the whole length of the manifolds. The foregoing examples of construction of the burners are only exemplary. The ceramic burners may have other dimensions. The pyramidal surface sections are not critical, but do provide more heated surface area. The primary purpose of the ceramic burners is to provide burner surfaces of essentially uniform heat over the surfaces thereof creating uniform radiant heat directed to the cooking area 16.

The gas/air mixture in the manifolds 48 and 49 are adjusted to provide a maximum heat which will be produced on the surface of the ceramic burner elements without having individual jets of flame at the apertures.

It has been determined that this is best accomplished by a mixture of a gas and air with substantially 35 to 65 percent air. This will produce a temperature in areas C (FIG. 3) on the order of 1200°-1600° F. There will be no individual jet flames from the apertures 82. Combustion takes place within the passages of apertures 82 and the outside surface of the burners will quickly reach the stated temperature. The burners then produce an orange glow evidencing the radiant heat.

The speed of the conveyor chain is adjusted in view of the type of food to be cooked. For example, frankfurters may take only 30 seconds going through approximately 16 linear inches of burners while meat chunks as shown in FIG. 3 could take up to 3 minutes depending on the cooked product desired (rare, medium, welldone) and the size of the chunks. Vegetables, particularly hard vegetables could take up to 3 minutes thus a speed control is provided for varying the speed of chain 21.

In operation, the gas/air mixture is adjusted, and when ignited, there will be hardly any flame appearing on the outside (with respect to the manifolds) of the ceramic elements. However, this will generate radiant heat of approximately 1200°-1600° F. in the cooking area.

Figure 5:
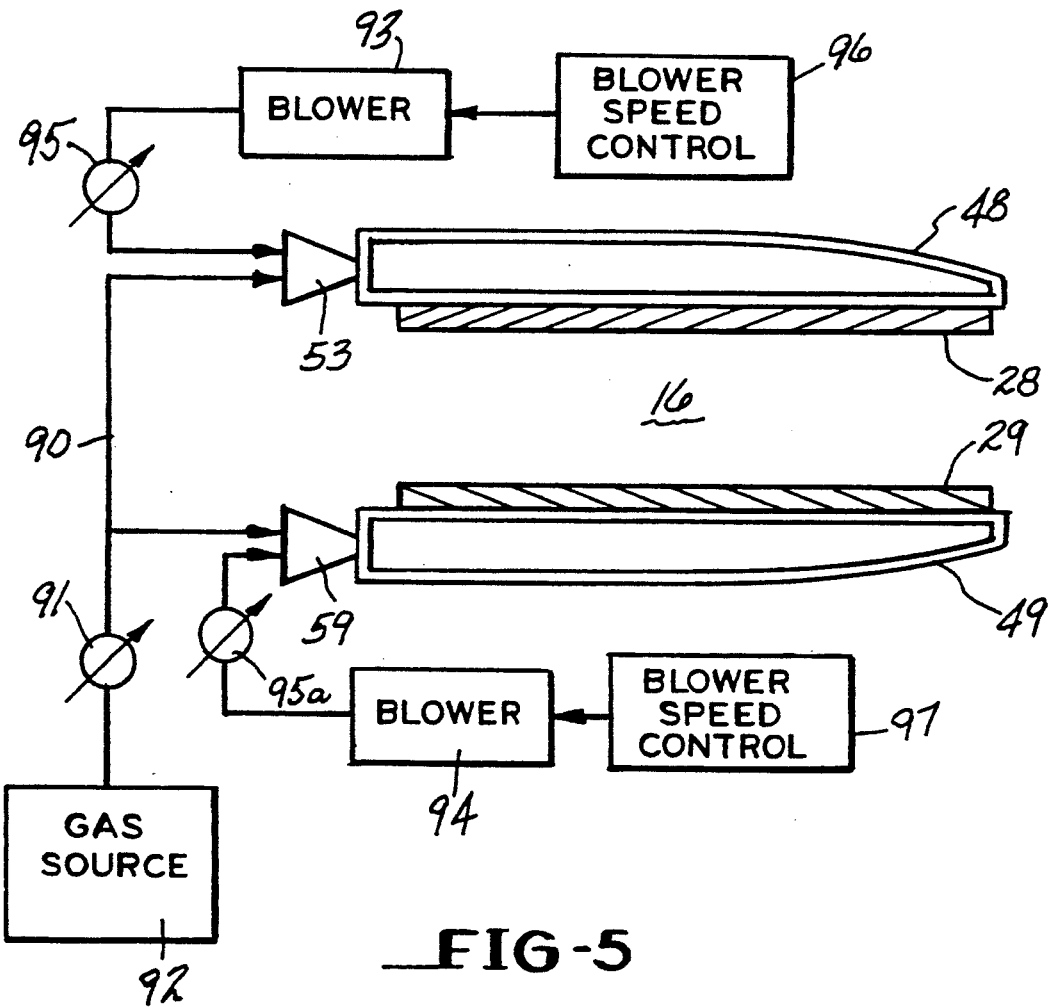
FIG. 5 is a view partially schematic and partially in block form of a control system for the invention.

Reference is now made to FIG. 5 which illustrates partially schematically and partially in block form the controls for the combustible fluid to manifolds 48 and 49. In FIG. 5 the manifolds 48 and 49 are shown spaced apart with the ceramic burners thereon defining the cooking area 16. The mixing nozzles 53 and 59 supplying combustible fluid to the manifolds each receive a gas such as propane over a gas line 90, which includes an adjustable pressure regulating valve 91, from a gas source 92. The gas source 92 may be a gas tank or a municipal supply of gas, preferably propane.

Each of the mixing nozzles receive air from one of the blowers 93 or 94 through air pressure control valves 95 and 95a respectively. Each of the blowers 93 and 94 have blower speed controls 96 and 97, respectively, which is exemplified as blower speed control knob 43 in FIG. 2. While two air blowers have been shown it will be understood that only one with appropriate air pressure valve 95 or 95a may be utilized.

In operation, the gas/air mixture is provided to the manifolds 48 and 49 (48a, 48b, 49a, 49b.) Then the gas-/air mixture exiting from the burners is ignited by the igniters 68 and 69. The burners will quickly come up to temperature and provide radiant heat on either side of cooking area 16 as exemplified by the lines R in FIG. 3 in the cooking area 16. The carriers of food as exemplified by skewers 23 having the eyes 24 thereon are placed on the carriers at the right hand end of the cooking assembly as shown in FIG. 1 and will pass through the cooking area 16 as the chain 21 moves about sprocket 19. The carriers 22 will move to a position such as shown by carrier 22a in FIG. 1 where the food carriers 23 will drop off of the carriers 22 into the recieving tray 29.

It is to be understood that a system embodying the invention may utilize dual pairs of burners on either side with two conveying chains or other conveying means, of which only one has been described, in which food to be cooked at lower temperatures may be positioned on the bottom chain while foods to be cooked at a higher temperature would be placed on the upper chain. Moreover, the two chains could move at differing speeds depending on the time of cooking.

It may thus be seen that the objects of the invention set forth, as well as those made apparent from the foregoing description, are efficiently attained. While preferred embodiments of the invention has been set forth for purposes of disclosure, modification to the disclosed embodiments of the invention, as well as other embodiments thereof, may occur to those skilled in the art. Accordingly, the appended claims are intOnded to cover all embodiments of the invention and modifications to the disclosed embodiments(s) which do not depart from the spirit and scope of the invention.

I claim:

1. A cooking device comprising a housing member having entrance and exit ends,
   a pair of horizontally directed cooking elements within said housing and defining a path for movement of food products therebetween, and a cooking area therebetween,
   transport means for moving food carriers through said path,
   a plurality of first carrier members carried on said transport means, said first carrier members constructed and arranged to carry second food carrier members thereon between said entrance and exit ends between said cooking elements and drop a second food carrier member at said exit end,
   a fluid manifold behind each of said cooking elements and extending at least the length of said cooking elements,
   said cooking elements comprising lengths of porous ceramic material,
   means for introducing a combustible fluid mixture under pressure to said manifolds whereby said fluid mixture will move through said porous ceramic and may be ignited on the other side of said ceramic elements and said ceramic elements provide heat on either side of food on said second carrier members.

2. The device of claim 1 wherein said transport mechanism comprises first and second spaced apart sprocket wheels having a chain thereover carrying said first carrier members.

3. The device of claim 2 wherein said first carrier members are in the form of hooks arranged to carry said second carrier members.

4. The device of claim 3 wherein said second carrier members have eyes thereon adapted to receive said hooks and be transported thereon through said defined path and be dropped from said hooks at said exit end.

5. The device of claim 1 wherein said manifolds receive a mixture of air and gas over air and gas supply lines, means for regulating said supply lines to provide an air-gas mixture to said manifolds of 35-65% air whereby said mixture will burn within said pourous ceramic at a high temperature and produce radiant heat from said burners.

6. A cooking device comprising a housing member having entrance and exit ends,
   a pair of horizontally directed cooking elements within said housing and defining a path for movement of food products and a cooking area therebetween,
   transport means for moving food carriers through said path,
   a plurality of first carrier members carried on said transport means, said first carrier members constructed and arranged to carry second food carrier members thereon between said entrance and exit ends between said cooking elements and drop a second food carrier member at said exit end, a fluid manifold behind each of said cooking elements and extending at least the length of said cooking elements, said housing member defining a hood having outlet openings at the top thereof, a shroud within said hood and defining paths for smoke and attendant products of cooking on either side of said hood above said cooking area whereby heated air, smoke and particles thereof move up said paths above said cooking area in a high temperature which burns off products of cooking, said paths defining a path on either side thereof for hot air and gases from said cooking area, and means for directing said hot air and gases to said paths where contaminants in said gases are burned.

7. The device of claim 6 wherein said transport mechanism comprises first and second spaced apart sprocket wheels having a chain thereover carrying said first carrier members.

8. The device of claim 6 wherein said cooking elements are lengths of pourous ceramic materials with a manifold therebehind receiving a gas-air mixture.

9. The device of claim 8 wherein said manifolds receive a mixture of air and gas over air and gas supply lines, means for regulating said supply lines to provide an air-gas mixture to said manifolds of 35-65% air whereby said mixture will burn within said pourous ceramic at a high temperature and produce radiant heat from said burners.

10. The device of claim 7 wherein said first carrier members are in the form of hooks arranged to carry said second carrier members.

11. The device of claim 10 wherein said second carrier members have eyes thereon adapted to receive said hooks and be transported thereon through said defined path and be dropped from said hooks at said exit end.

* * * * *